Oct. 7, 1930.  H. C. HOLLINGER  1,777,364
VEHICLE
Filed March 7, 1929  2 Sheets-Sheet 2

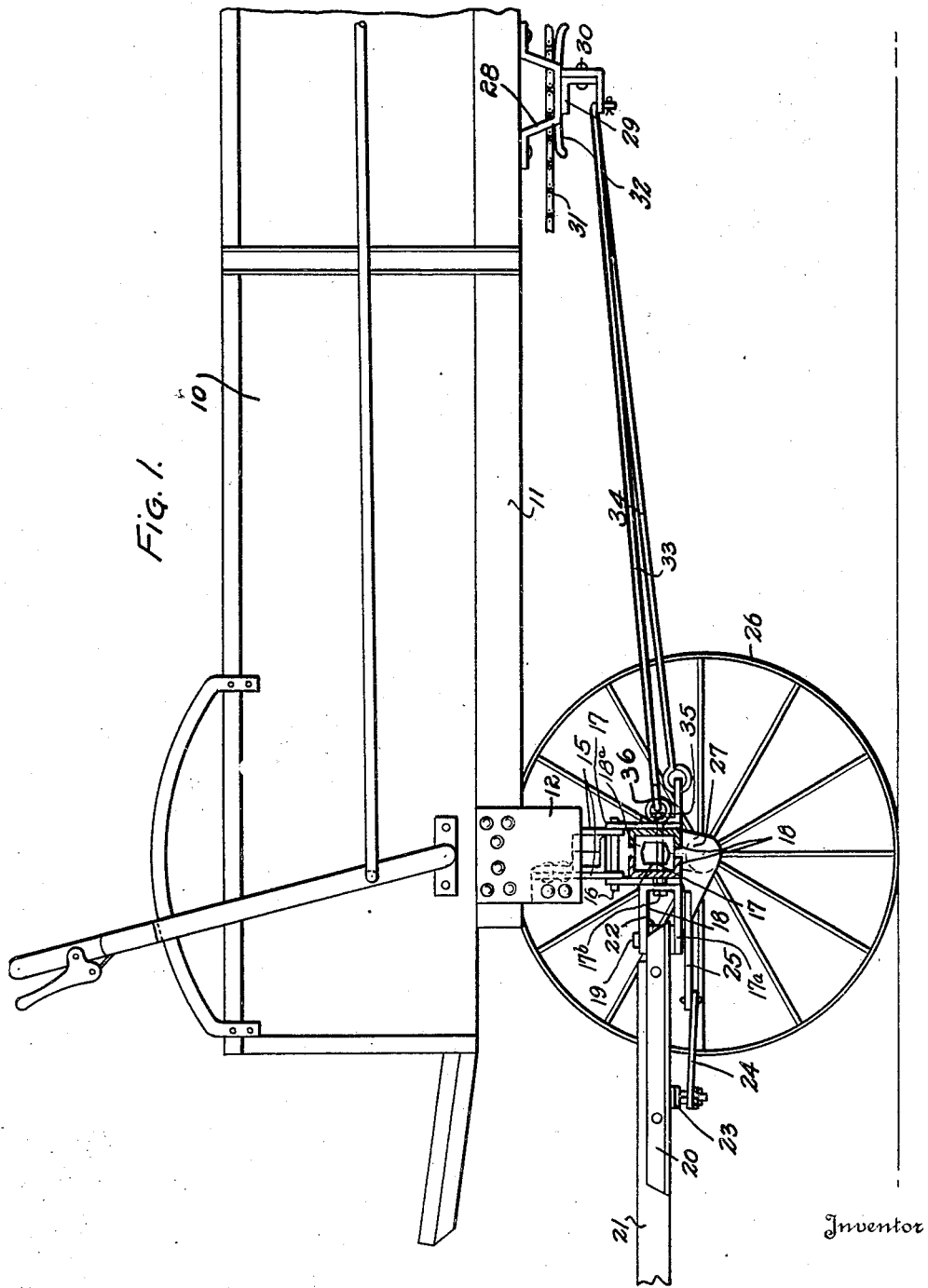

Inventor
Harry C. Hollinger
By Walter W. Burns
Attorney

Patented Oct. 7, 1930

1,777,364

UNITED STATES PATENT OFFICE

HARRY C. HOLLINGER, OF YORK, PENNSYLVANIA, ASSIGNOR TO A. B. FARQUHAR CO., LIMITED, OF YORK, PENNSYLVANIA, A LIMITED PARTNERSHIP OF PENNSYLVANIA

VEHICLE

Application filed March 7, 1929. Serial No. 345,120.

This invention relates to vehicles and particularly to the forward portion of a chassis adapted for heavy work as in manure spreaders.

In vehicle bodies which are intended for use over rough ground as for example, manure spreaders, there is a tendency for the body to become warped due to the fact that the wheels are not always in the same plane and there is also a tendency for the front truck to be pulled from under the body, the parts becoming sometimes bent sufficiently to cause binding between the contacting parts. This latter tendency is brought about by the fact that the pull on the truck at a point below the load causes the lower portion of the front truck to be forced to a position forward of its normal position. This causes the parts to be bent and the binding, above-mentioned, results.

The primary object of this invention is the provision of an improved chassis for a vehicle.

Another object of this invention is the provision of an improved chassis for a vehicle which has the load connected to the traction means in substantially a direct line.

Another object of this invention is the provision of a chassis having a three point suspension for the body with no binding action on the body from the movement of the front wheels up and down.

Another object of this invention is the provision of parts in a chassis to take a rearward strain on a front wheel and distribute it to the load without placing any strain on the front truck supporting connection to the main frame.

Another object of this invention is the provision of a chassis wherein the front truck is connected to the forward part of the frame with a single connection at the center line of the frame, the two outer ends of the front truck being permitted to freely swing up and down about centers so far to the rear that the swinging is practically in a vertical plane.

Other and further objects of the invention will be apparent to one skilled in the art from a reading of the complete specification and claims.

Referring to the drawing wherein there is illustrated an embodiment of the invention.

Figure 1 is a side elevation of a portion of the vehicle illustrating the invention as applied to a manure spreader, one wheel being removed for clearness.

Similar reference characters refer to the same or similar parts throughout the several views of the drawing.

Figure 3:
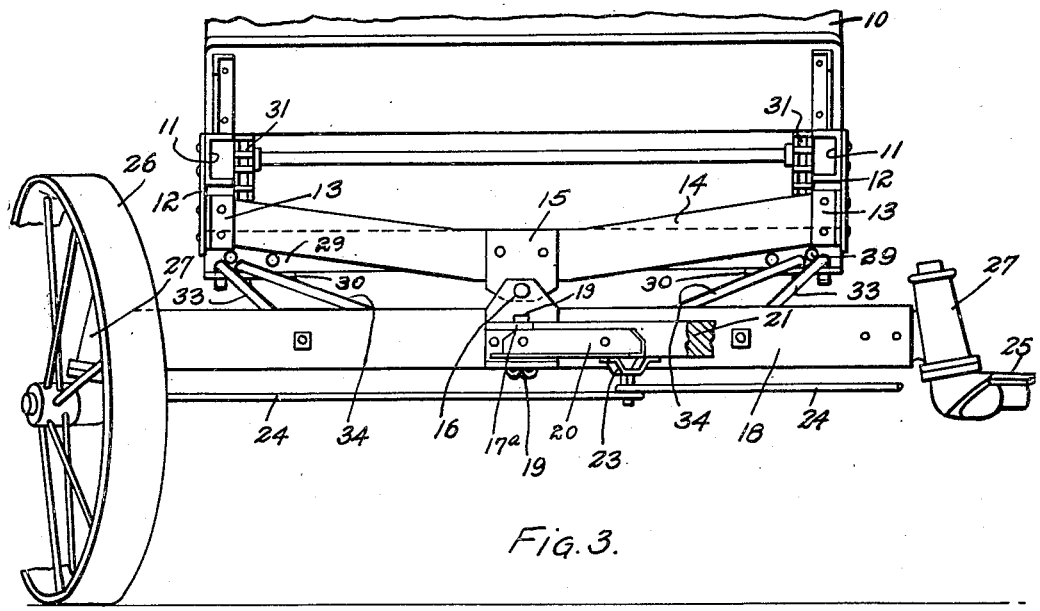
Figure 3 is a front view of the device showing the wheels turned at an angle, the tongue being removed for the sake of clearness.
Figure 2:
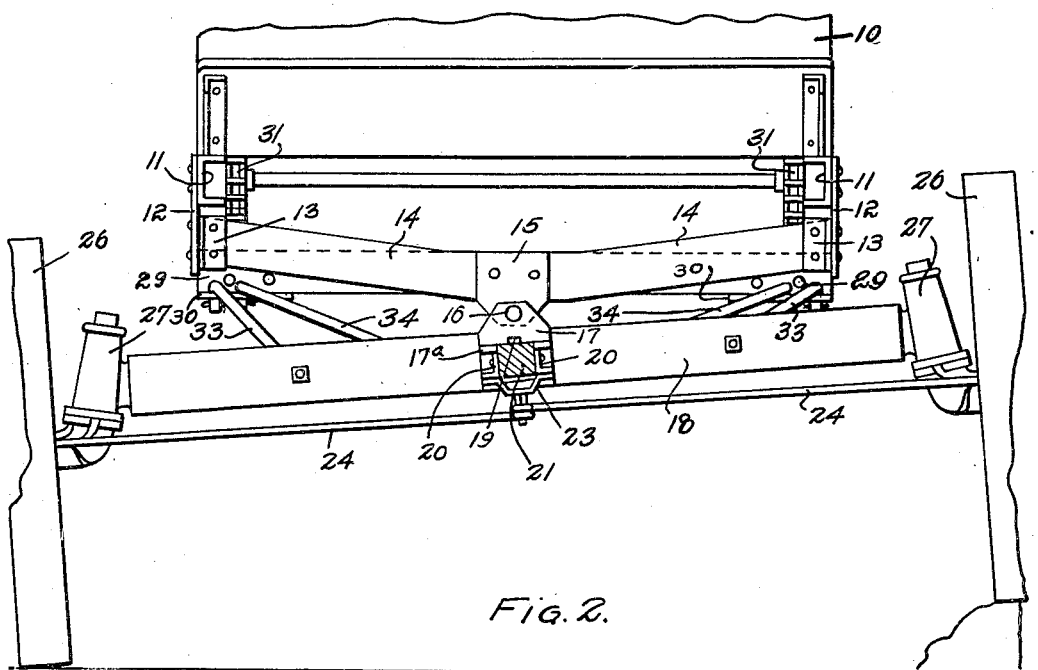
Figure 2 is a front elevation showing one wheel going over an obstruction; the tongue being removed for the sake of clearness.

In the drawing, 10 represents the body of the vehicle illustrated as a manure spreader. The body sets upon a frame 11 of the chassis which frame is supported by a pair of wheels at the rear of the vehicle. The rear wheel construction is not a part of this invention and consequently the details of the rear wheels are not set forth. It might be stated that any suitable rear construction which supports the body the full length of the axle may be used.

The side members of the frame 11 are illustrated as channel bars with their open sides inward. At their forward ends, on the outside plane surfaces, are placed securing plates 12. To these plates 12 are secured small angle pieces 13 to which a transverse bar 14 is secured at its ends by suitable bolts or rivets. This transverse bar 14 is slightly V-shaped, the point of the V being a point of support for the forward end of the chassis. At the middle of the length of this transverse bar 14 are bolted two plates forming together a saddle which is referred to hereinafter as the saddle 15 and which saddle 15 is provided at its lower portion with a hole carrying the pivot bolt or pin 16. Pivoted to the bolt 16 are the central supporting members 17 of the transverse axle member constructed of channels 18 and having therebetween the spacer block 18ª.

The transverse member 14 is preferably of an angle iron construction, there being a suitable block within the saddle member 15 to make the saddle member of rectangular cross section and have its space filled with metal.

Supporting members 17 are bolted respectively to the front and rear of transverse axle members 18. These members 17 are provided with openings through which pivot pin 16 extends and forms a pivot connection between the transverse member 14 and the transverse axle composed of the channels 18.

Between the transverse channel members 18, is a spacer member 18ª to hold the channel member in spaced relation.

On the forward plate 17 is secured a U-shaped member 17ª. This U-shaped member 17ª is held in place by means of bolts 17ᵇ which pass through the U-shaped member 17ª, forward and rearward plates 17, transverse axle members 18 and the angle piece 36, to be further described. The U-shaped member 17ª carries a vertical pivot 19 to which the draft mechanism, to be described, is connected. On this vertical pivot 19 is pivoted the guides 20 which receive the tongue 21. The rear ends of the guides 20 are secured to the casting 22 through which the pivot passes.

To the lower sides of the guides 20 and distant from the casting 22 is secured a steering control member 23 which carries a bearing for two links 24. These links 24 connect pivotally to spindle arms 25 which turn the wheels 26 which are mounted on substantially vertical pivots 27.

These pivots 27 are preferably pointed upwardly and slightly inwardly and to the rear. This has been found to assist the wheels in tracking properly.

It will be noted that the transverse axle 18 between its limits of movement has but one connection to the transverse member 14, this connection being at its middle. This construction gives a free movement to the axle which is independent of the position of the chassis and the weight of the load. Sometimes, particularly on uneven ground, there is a tendency for the wheels to be thrown out of vertical planes with the wheel axle forward of the desired position.

In order to maintain the transverse axle member 17 in its proper position, regardless of the position it is caused to take by undulating ground, I provide connections which I will now describe.

Secured to the underside of the frame members 11 and at a distance to the rear of the front wheels are hangers 28, one secured to each side of the frame 11. These hangers 28 support the ends of an angle iron cross member 29 having its open sides forward and downward. Adjacent the ends are secured short angle iron pieces 30, each having two openings for a purpose to be described. The angle iron cross member 29 acts as a support to carry the middle of the lower length of the conveyor chain 31, the upper length moving on the floor of the vehicle to carry the manure to the rear. Suitable guides 32 are provided on the cross member 29 to guide the conveyor chain thereover.

Connecting the transverse axle member 18 with the cross member 29, through the angle pieces 30, are tension and compression links. These links in the embodiment illustrated are four in number, the outside links 33 and the inside links 34.

The outside links 33, are secured at their forward ends to eye bolts 35 which are secured to the transverse axle member 18. These forward ends of the rods 33 are preferably connected to the transverse members 18 as far from the pivot member 16 as possible. The ideal position would be adjacent the wheel pivot. This distance from the wheel is actually determined by the innermost position of the wheel when executing a turn. The rods 33, should, of course, not interfere with the wheels 26.

The angle piece 36 is secured to the rear face of the rear member 17 by means of the bolts 17ᵇ, already described. Eyes of the inner rods 34 are connected to openings in the horizontal portion of the angle piece 36. The outer rods 33 and the inner rods 34 are connected, one each, at their rear ends and adjacent the outer ends of the cross angle member 29, to the respective openings of the angle pieces 30. In this way a W-frame bracing system is applied to the transverse axle members 18 to hold them in their places as to a forward and rearward movement relative to the frame 11 of the vehicle yet permitting free and unobstructed vertical tilting movement. The forward and rearward strains due to the wheels encountering irregularities are taken care of by the outer rods 33 while strains due to the pulling or pushing of the draft member are taken up by the inner rods 34.

In addition, the inner rods 34 come into action when any cross or diagonal thrusts are produced as in making turns or when one wheel strikes an obstruction. These rods 33 and 34 with the W-construction, prevent any tendency toward a movement in any direction in a horizontal plane, but at the same time offering no obstruction to movement in a vertical plane about the axis of the pin 16. Suitable cotter pins are provided for holding the rear ends of the rods 33 and 34 in place.

It is to be noted that the frame of this device is supported on a single horizontal pivot at the forward end and that no sliding guides which might by friction resist the lifting of one wheel when encountering an obstruction, are provided. These guides would be unnecessary since the ends of the front axle move with the rods 33 as radii about the rear ends of these rods 33.

It is to be also noted that there is a solid connection between the frame of the vehicle and the draft means, this connection being substantially in a single plane.

While there is illustrated and described in detail, an embodiment of this invention, it is to be understood that there is no intention to limit the invention to the details shown and described, but that modifications and changes may be made, without departing from the spirit of the invention and within the scope of the appended claims.

Having described the invention what is claimed and desired to be secured by Letters Patent is:—

1. A vehicle having a chassis, the chassis having a frame, front wheels, a support for the wheels, the support being connected to the frame at substantially midway of the distance between wheels, a draft means secured to the wheel support, means connected to the frame and to the wheel support at substantially the same level as the draft means and constructed to transmit strains between the frame and wheel support, either from the wheels on the ground or from the draft on the draft means and to transmit the strains directly to the frame independently of the frame connection, said connecting means being constructed also to allow of free and unobstructed movement of the wheel support in a substantially vertical plane, thereby taking the strains from the wheel support and delivering them to the frame without tendency to twist the wheel support adjacent its frame connection and without tendency to warp the frame.

2. A vehicle having a chassis, the chassis having a frame, front wheels, a support for the wheels, the support being connected to the frame at substantially midway of the distance between wheels, a draft means secured to the wheel support, means, including pivotally supported rods, spacedly connected to the frame and to the wheel support outward of its center and at substantially the same level as the draft means and constructed to move freely up and down at the support and to transmit strains directly to the frame from the wheel support independently of the frame connection, thereby taking the strains from the wheel support and delivering them to the frame without tendency to twist the wheel support adjacent its frame connection and without tendency to warp the frame.

3. A vehicle having a chassis, the chassis having a frame, front wheels, a support for the wheels, the support being connected to the frame at substantially midway of the distance between wheels, a draft means secured to the wheel support, means, including pivotally supported rods, spacedly connected to the frame and to the wheel support outward of its center and at substantially the same level as the draft means and constructed to move freely up and down at the support and to transmit strains directly to the frame from the wheel support independently of the frame connection, thereby taking the strains from the wheel support and delivering them to the frame without tendency to twist the wheel support adjacent its frame connection and without tendency to warp the frame.

4. A vehicle having a chassis, the chassis having a frame, front wheels, a support for the wheels, the support being connected to the frame at substantially midway of the distance between wheels, a draft means secured to the wheel support, means including rods, spacedly connected to the frame and to the wheel support and at substantially the same level as the draft means and constructed to move freely up and down at the support and to transmit strains directly to the frame from the wheel support independently of the frame connection, thereby taking the strains from the wheel support and delivering them to the frame without tendency to twist the wheel support adjacent its frame connection and without tendency to warp the frame.

5. A vehicle having a chassis, the chassis having a frame, front wheels, a support for the wheels, the support being connected to the frame at substantially midway of the distance between wheels, a draft means secured to the wheel support, means including rods pivoted at their rear ends and spacedly connected to the frame and to the wheel support outward of its center and at substantially the same level as the draft means and constructed to move freely up and down at the support and to transmit strains directly to the frame from the wheel support independently of the frame connection, thereby taking the strains from the wheel support and delivering them to the frame without tendency to twist the wheel support adjacent its frame connection and without tendency to warp the frame.

6. A vehicle having a chassis, the chassis having a frame, front wheels, a support for the wheels, the support being connected to the frame at substantially midway of the distance between wheels, a draft means secured to the wheel support, means including rods pivoted at their forward ends and spacedly connected to the frame and to the wheel support outward of its center and substantially the same level as the draft means and constructed to move freely up and down at the support and to transmit strains directly to the frame from the wheel support independently of the frame connection, thereby taking the strains from the wheel support and delivering them to the frame without tendency to twist the wheel support adjacent its frame connection and without tendency to warp the frame.

7. A vehicle having a chassis, the chassis having a frame, front wheels, a support for the wheels, a draft means connected to the support adjacent its center, the support being connected to the frame at substantially midway of the distance between wheels and means for preventing strains in the connecting means as a result of relatively forward or rearward thrusts on the connecting means between the frame and wheel support, said preventing means comprising rods extending from the supporting means adjacent its center at substantially the level of the draft means and extending divergently rearwardly to the frame.

8. A vehicle having a chassis, the chassis having a frame, front wheels, a support for the wheels, the support being connected to the frame at substantially midway of the distance between wheels and means for preventing strains in the connecting means as a result of relatively forward or rearward thrusts on the connecting means between the frame and wheel support, said preventing means comprising rods extending from the supporting means adjacent its center and from points outwardly of its center, rearwardly and divergently to the frame.

9. A vehicle having a chassis, the chassis having a frame, front wheels, a support for the wheels, a draft means connected to the support, the support being connected to the forward end of the frame by a single connection at substantially midway of the distance between wheels, the connection being a pivot having a horizontal axis, and means for preventing strains in the connection as a result of relatively forward or rearward thrusts on the connection between the frame and wheel support, said preventing means comprising rods extending from the support means at substantially the level of the draft means rearwardly to the frame.

10. A vehicle having a chassis, the chassis having a frame, front wheels, a support for the wheels, a draft means connected to the support, the support being connected to the forward end of the frame by a single connection at substantially midway of the distance between wheels, the connection being a pivot having a horizontal axis, and means for preventing strains in the connection as a result of relatively forward or rearward thrusts on the connection between the frame and wheel support, said preventing means comprising rods pivoted to the support at their forward ends at substantially the level of the draft means and extending from the supporting means rearwardly to the frame.

11. A vehicle having a chassis, the chassis having a frame, front wheels, a support for the wheels, a draft means connected to the support, the support being connected to the forward end of the frame by a single connection at substantially midway of the distance between wheels, the connection being a pivot having a horizontal axis, and means for preventing strains in the connection as a result of relatively forward or rearward thrusts on the connection between the frame and wheel support, said preventing means comprising rods pivoted to the support at their forward and rear ends and extending from the supporting means rearwardly to the frame, the connection of the draft means and rods being made to the support at substantially the same level.

12. A vehicle having a chassis, the chassis having a frame, front wheels, a support for the wheels, a draft means connected to the support, the support being connected to the forward end of the frame by a single connection at substantially midway of the distance between wheels, the connection being a pivot having a horizontal axis, and means for preventing strains in the connection as a result of relatively forward or rearward thrusts on the connection between the frame and wheel support, said preventing means comprising rods pivoted to the support at their forward ends at points at substantially the level of the draft connection outward of the connection and extending from the supporting means rearwardly to the frame.

13. A vehicle having a chassis, the chassis having a frame, front wheels, a support for the wheels, a draft means connected to the support, the support being connected to the forward end of the frame by a single connection at substantially midway of the distance between wheels, the connection being a pivot having a horizontal axis, and means for preventing strains in the connection as a result of relatively forward or rearward thrusts on the connection between the frame and wheel support, said preventing means comprising rods pivoted to the support at their forward ends at points at substantially the level of the draft connection outward of the connection and extending from the supporting means divergently and rearwardly to the frame.

14. A vehicle having a chassis, the chassis having a frame, front wheels, a support for the wheels, a draft means connected to the support, the support being connected to the forward end of the frame by a single connection at substantially midway of the distance between wheels, the connection being a pivot having a horizontal axis, and means for preventing strains in the connection as a result of relatively forward or rearward thrusts on the connection between the frame and wheel support, said preventing means comprising rods extending from the support adjacent its center and at substantially the same level as the draft means connection and divergently rearwardly to the frame.

15. A vehicle having a chassis, the chassis having a frame, front wheels, a support for the wheels, the support being connected to the forward end of the frame by a single connection at substantially midway of the distance between wheels, the connection being a pivot, having a horizontal axis, and means for preventing strains in the connection as a result of relatively forward or rearward thrusts on the connection between the frame and wheel support, said preventing means comprising rods extending from the supporting means adjacent its center and from points outward of its center to the frame.

16. A vehicle having a chassis, the chassis having a frame, front wheels, a support for the wheels, the support being connected to the forward end of the frame by a single connection at substantially midway of the distance between wheels, the connection being a pivot having a horizontal axis, and means for preventing strains in the connection as a result of relatively forward or rearward thrusts on the connection between the frame and wheel support, said preventing means comprising rods extending from the supporting means adjacent its center and from points outward of its center divergently to the frame.

In testimony whereof I hereunto affix my signature.

HARRY C. HOLLINGER.